United States Patent
Poulton et al.

(10) Patent No.: US 10,790,585 B2
(45) Date of Patent: Sep. 29, 2020

(54) SYSTEMS, METHODS, AND STRUCTURES FOR OPTICAL PHASED ARRAY CALIBRATION VIA INTERFERENCE

(71) Applicant: ANALOG PHOTONICS LLC, Boston, MA (US)

(72) Inventors: Christopher Poulton, Cambridge, MA (US); Peter Russo, Somerville, MA (US); Erman Timurdogan, Somerville, MA (US); Matthew Byrd, Arlington, MA (US); Diedrik Vermeulen, Boston, MA (US); Ehsan Hosseini, Milton, MA (US)

(73) Assignee: Analog Photonics LLC, Boston, MA (US)

( * ) Notice: Subject to any disclaimer, the term of this patent is extended or adjusted under 35 U.S.C. 154(b) by 8 days.

(21) Appl. No.: 16/279,885

(22) Filed: Feb. 19, 2019

(65) Prior Publication Data

US 2019/0260123 A1     Aug. 22, 2019

Related U.S. Application Data

(60) Provisional application No. 62/631,576, filed on Feb. 16, 2018.

(51) Int. Cl.
    *H01Q 3/26*      (2006.01)
    *G02F 1/295*      (2006.01)
    (Continued)

(52) U.S. Cl.
    CPC .......... *H01Q 3/2676* (2013.01); *G02F 1/292* (2013.01); *G02F 1/2955* (2013.01); *H04B 10/25753* (2013.01)

(58) Field of Classification Search
    CPC .......... H01Q 3/26; H01Q 3/42; H01Q 3/2676; G02F 1/292; G02F 1/2955
    (Continued)

(56) References Cited

U.S. PATENT DOCUMENTS 4,378,559 A * 3/1983 Rittenbach ............. H01Q 25/00
    342/374
5,333,000 A * 7/1994 Hietala ..................... G02F 2/02
    342/368

(Continued)

FOREIGN PATENT DOCUMENTS

WO      2014110017 A1      7/2014

OTHER PUBLICATIONS

L. Li et al., "Fast Optical Phased Array Calibration Technique for Random Phase Modulation LiDAR", IEEE Photonics Journal, Feb. 2019, vol. 11, No. 01.

(Continued)

*Primary Examiner* — Tung X Le
(74) *Attorney, Agent, or Firm* — Young Basile Hanlon & MacFarlane, P.C.

(57) ABSTRACT

Aspects of the present disclosure describe systems, methods, and structures for optical phased array calibration that advantageously may be performed as a single-pass measurement of phase offset with respect to only a single interference measurement. In sharp contrast to the prior art—systems, methods, and structures according to aspects of the present disclosure advantageously produce phase offsets and phase functions of each element without time-consuming iterative procedures or multiple detector signals as required by the prior art.

25 Claims, 18 Drawing Sheets

(51) Int. Cl.
*G02F 1/29* (2006.01)
*H04B 10/2575* (2013.01)

(58) Field of Classification Search
USPC .......... 343/753, 853–855; 342/157, 368, 375
See application file for complete search history.

(56) References Cited

U.S. PATENT DOCUMENTS

| | | | |
|---|---|---|---|
| 6,020,850 A * | 2/2000 | Ji | H01Q 3/2676 342/368 |
| 7,408,507 B1 | 8/2008 | Paek et al. | |
| 7,671,799 B1 * | 3/2010 | Paek | H01Q 1/405 342/368 |
| 7,683,833 B2 * | 3/2010 | Floyd | H01Q 3/30 342/372 |
| 7,822,398 B2 | 10/2010 | Roberts | |
| 10,074,901 B2 | 9/2018 | Byun et al. | |
| 2003/0002790 A1 | 1/2003 | Johnson et al. | |
| 2006/0210279 A1 * | 9/2006 | Hillis | H04B 10/1121 398/118 |
| 2007/0058686 A1 | 3/2007 | Capasso et al. | |
| 2013/0016021 A1 * | 1/2013 | Blair | H01Q 21/061 343/720 |
| 2014/0192394 A1 | 7/2014 | Sun et al. | |
| 2014/0376001 A1 | 12/2014 | Swanson | |
| 2018/0039154 A1 * | 2/2018 | Hashemi | G02F 1/292 |
| 2018/0175501 A1 * | 6/2018 | Byun | G02F 1/292 |

OTHER PUBLICATIONS

T. Komljenovic et al., "On-chip calibration and control of optical phased arrays", Optics Express, Feb. 5, 2018, pp. 3199-3210, vol. 26, No. 3.

L. E. Roberts, "Internally Sensed Optical Phased Arrays", Jul. 5, 2016, thesis submitted for the degree of Doctor of Philosophy at the Australian National University.

* cited by examiner

SYSTEMS, METHODS, AND STRUCTURES FOR OPTICAL PHASED ARRAY CALIBRATION VIA INTERFERENCE

CROSS REFERENCE TO RELATED APPLICATIONS

This application claims the benefit of U.S. Provisional Patent Application Ser. No. 62/631,576 filed 16 Feb. 2018.

TECHNICAL FIELD

This disclosure relates generally to optical phased arrays. More particularly it pertains to systems, methods, and structures for optical phased array calibration via interference.

BACKGROUND

As is known, chip-scale optical phased arrays (OPAs) are of enormous contemporary interest as they have proven useful for a number of applications including light detection and ranging (LiDAR), free space communications, holographic displays, and biomedical imaging. Known advantages of OPAs for such applications include reduced size and weight, relatively low cost, and high reliability. Given the societal significance of such applications, it follows that the calibration of OPAs is of the utmost importance. Accordingly, systems, methods, and structures that provide for the improved calibration of OPAs would represent a welcome addition to the art.

SUMMARY

An advance in the art is made according to aspects of the present disclosure directed to systems, methods, and structures for optical phased array calibration via interference signals.

In sharp contrast to the prior art—and according to aspects of the present disclosure—calibration of optical phased arrays may advantageously be performed as a single-pass measurement of phase offset with respect to only a single interference signal. In further contrast to the prior art—systems, methods, and structures according to aspects of the present disclosure advantageously produce phase offsets and phase functions of each element without time-consuming iterative procedures or multiple detector signals as required by the prior art.

Viewed from one illustrative aspect, optical phased array systems, methods, and structures according to aspects of the present disclosure may include an optical structure comprising, a substrate upon which is formed—an array of optical phase shifters, an array of optical antennas in optical communication with the array of optical phase shifters, an output optical distribution network in optical communication with the array of optical antennas; and a detector element in optical communication with the output optical distribution network—said optical structure configured such that light traversing the optical phase shifters is phase shifted, the phase shifted light is directed to the optical antennas where at least a portion is transmitted therethrough, the transmitted light from all of the phase shifters is directed to the output optical distribution network and subsequently to the detector element which detects the transmitted light from each phase shifter as an interference signal, wherein individual optical paths between the optical antennas and the detector element are all equal in length. Advantageously, such optical path length equality enables a valid calibration for a wide range of wavelengths.

Viewed from yet another illustrative aspect, optical phased array systems, methods, and structures according to aspects of the present disclosure may include an optical structure comprising, a substrate upon which is formed—an input optical distribution network, an array of optical phase shifters in optical communication with the input optical distribution network, an array of optical antennas in optical communication with the array of optical phase shifters, an array of reflector elements, in optical communication with the array of optical phase shifters, a detector element in optical communication with, and positioned in an optical path before the array of optical phase shifters—said optical structure configured such that light traversing the optical phase shifters is phase shifted, the phase shifted light is directed toward the array of reflector elements where at least a portion of the phase shifted light is reflected back through the optical phase shifters and subsequently directed as an interference signal to the detector element which detects the interference signal.

Viewed from yet another illustrative aspect, optical phased array systems, methods, and structures according to aspects of the present disclosure may include a calibration method for an optical structure, the optical structure comprising a substrate onto which is formed an array of phase shifting elements in optical communication with an array of emitting antenna elements, the method comprising—directing individual light signals through the phase shifting elements such that the individual light signals are phase shifted; directing the phased shifted light signals to the array of emitting antennas from which they are emitted; wherein for each individual one of the array of phase shifting elements—varying an amount of phase shift imparted by the individual phase shifting element over a pre-determined pattern; while detecting an interference signal produced by the emitted phase shifted light signals; —and determining an overall phase offset with respect to the interference signal for the optical structure from the interference signals detected.

BRIEF DESCRIPTION OF THE DRAWING

A more complete understanding of the present disclosure may be realized by reference to the accompanying drawing in which.

Figure 1:
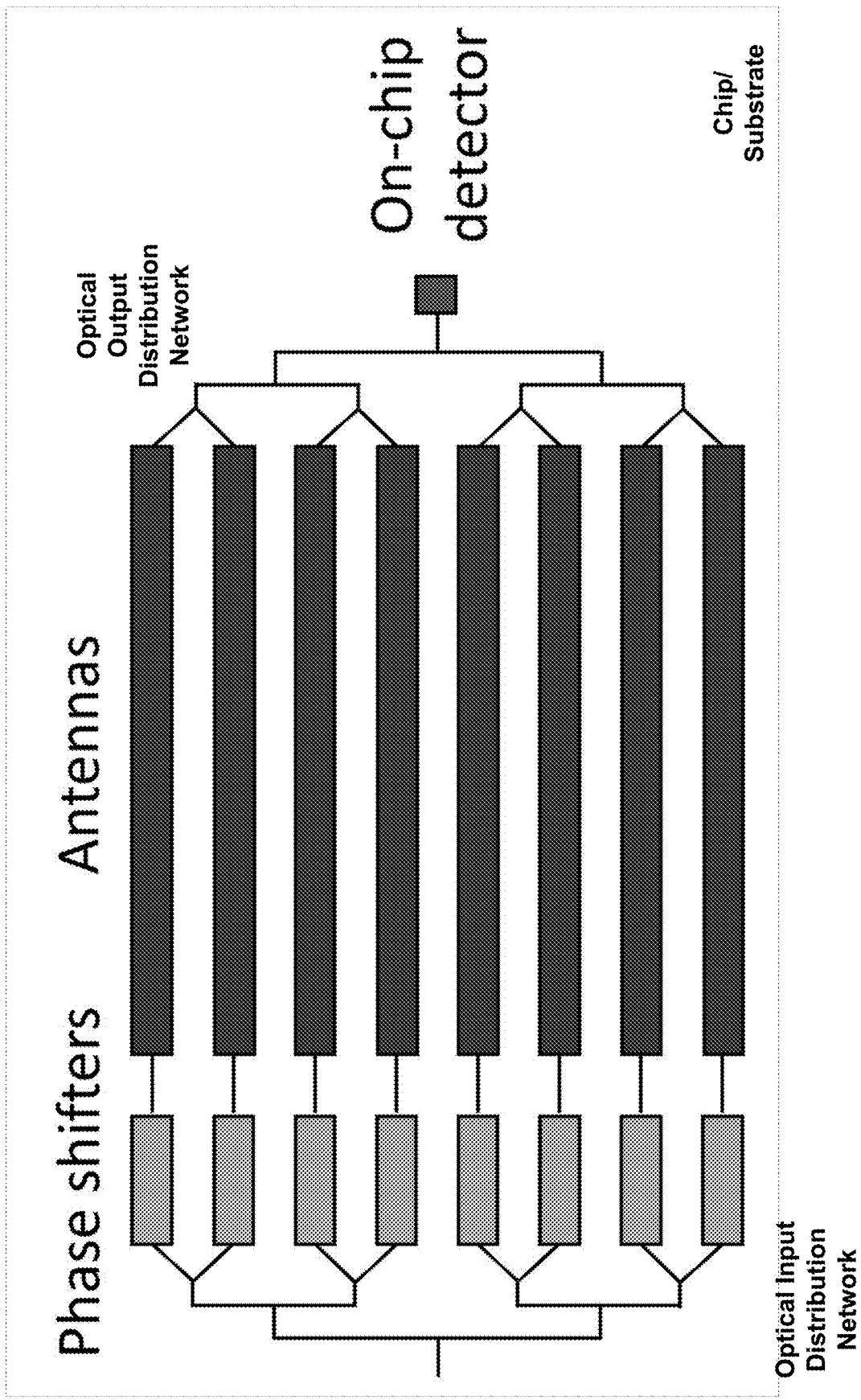
FIG. 1 is a schematic diagram showing an illustrative optical phased array (OPA) structure including an on-chip detector according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, it is noted that optical phased arrays have found widespread applicability for transmitting and receiving light with diffraction limited output beams. To construct a large aperture, thousands of elements are required. In order to produce a desired phase distribution across the elements for beam forming, a fast, efficient, and robust calibration procedure is required. Ideally, such procedure(s) are performed on-chip such that calibration may be performed in-field.

As will become readily apparent to those skilled in the art upon reviewing the present disclosure, systems, methods and structures according to the present disclosure advantageously and directly measure unknown individual phase offsets and phase versus control signals of a plurality of optical elements that form at least a portion of an optical phased array. Of particular advantage, only a single detector element is required to make the measurement(s) although—more than one detector may be used.

As will be further understood by those skilled in the art, these unknown phase offsets of the optical elements may be caused by variations in wafer properties, fabrication induced phase noise, thermal gradients, or other processes.

Briefly, aspects of the present disclosure involve measuring a varying intensity of an interference of the elements while individually sweeping the phase of each element. We note that such interference—as used herein—is a sum of optical signals in the optical with a single photodetector or a sum of optical signals in the optical and electrical domains with multiple photodetectors. A background field caused by the elements is used as a reference to determine the phase of each element. This background field may be randomly assigned or selected by modifying phase shifter control signals. When an individual element is swept, the background field remains nearly constant due to the large number of elements in the overall optical phased array.

With this broad discussion in place, we now turn to some specific configurations and operations of systems, methods, and structures according to aspects of the present disclosure.

FIG. 1 is a schematic diagram showing an illustrative optical phased array (OPA) structure including an on-chip detector according to aspects of the present disclosure.

With reference to that figure, shown is an optical structure which generally includes a substrate having an optical waveguide pattern formed thereon, the pattern including a light receiving end configured to receive and distribute light to an array of phase shifting elements. Shown further in the figure is an array of antennas which are configured to receive phase shifted light and emit at least a portion of that received light.

Depending upon the particular antenna configuration(s) and construction, those skilled in the art will know and appreciate that not all of the phase shifted light received by the antenna necessarily is emitted. Instead, at least a portion of the light is transmitted through the antenna after which it is directed through the effect of an output optical distribution network and to a detector element.

Operationally, and according to an illustrative aspect of the present disclosure, light received by the input optical distribution network is phase shifted by the phase shifters and directed to the antenna elements. Portions of the phase shifted light that is transmitted through the antennas is then directed to the output optical distribution network and subsequently directed to an on-chip detector as an interference signal that includes light from each of the phase shifters. As noted previously, such an interference signal is the sum of the light signals output by the output optical distribution network.

We note at this point that the waveguide pattern formed upon the substrate generally optically interconnects and includes the elements described above and may be advantageously implemented on substrate(s) using known—i.e., CMOS—fabrication techniques and constructed from Si (or SiN) waveguides.

Note further that while we have shown the distribution networks to include a binary tree distribution network, such is for illustrative purposes only. As will be readily appreciated by those skilled in the art, such distribution networks according to the present disclosure may be constructed from any or a combination of known structures including cascaded 1×N splitters, binary trees, star coupler(s), a single 1×M splitter, directional coupler(s), free space, and other, known waveguide structures such as slab waveguides.

According to aspects of the present disclosure—for transmissive structures—optical path lengths between individual antenna elements and the detector element are all the same length.

Also, we note that while we have shown an equal number of phase-shifting and antenna elements, such is not required. The exact number of phase shifters and antennae will depend upon the particular waveguide interconnect employed. Also, while the figures such as FIG. 1 show illustrative structures having eight (8) phase shifters and antennae, this disclosure is not so limited and virtually any number of elements are possible as fabrication techniques and application dictates. Accordingly, any size structure is contemplated and may advantageously be made on a single, integrated semiconductor chip or photonic integrated circuit. Systems constructed according to the present disclosure may include both integrated electronic circuits and integrated photonic circuits—interconnected and/or integrated as appropriate.

Those skilled in the art will readily understand and appreciate that any phase shifters employed in the phase shifting elements may include thermo-optic, electro-optic, mechanical, fluidic, liquid crystal, non-linear, acousto-optic, and stress-induced phase shifters, while antenna may include grating-based design(s), plasmonic emitters, metal antennae, mirror facet, and end-fire facet—as appropriate.

Finally, the detector element may include one or more individual photodetectors of any kind known in the art that generally receives an optical signal as input and outputs an electrical signal in response.

Figure 2:
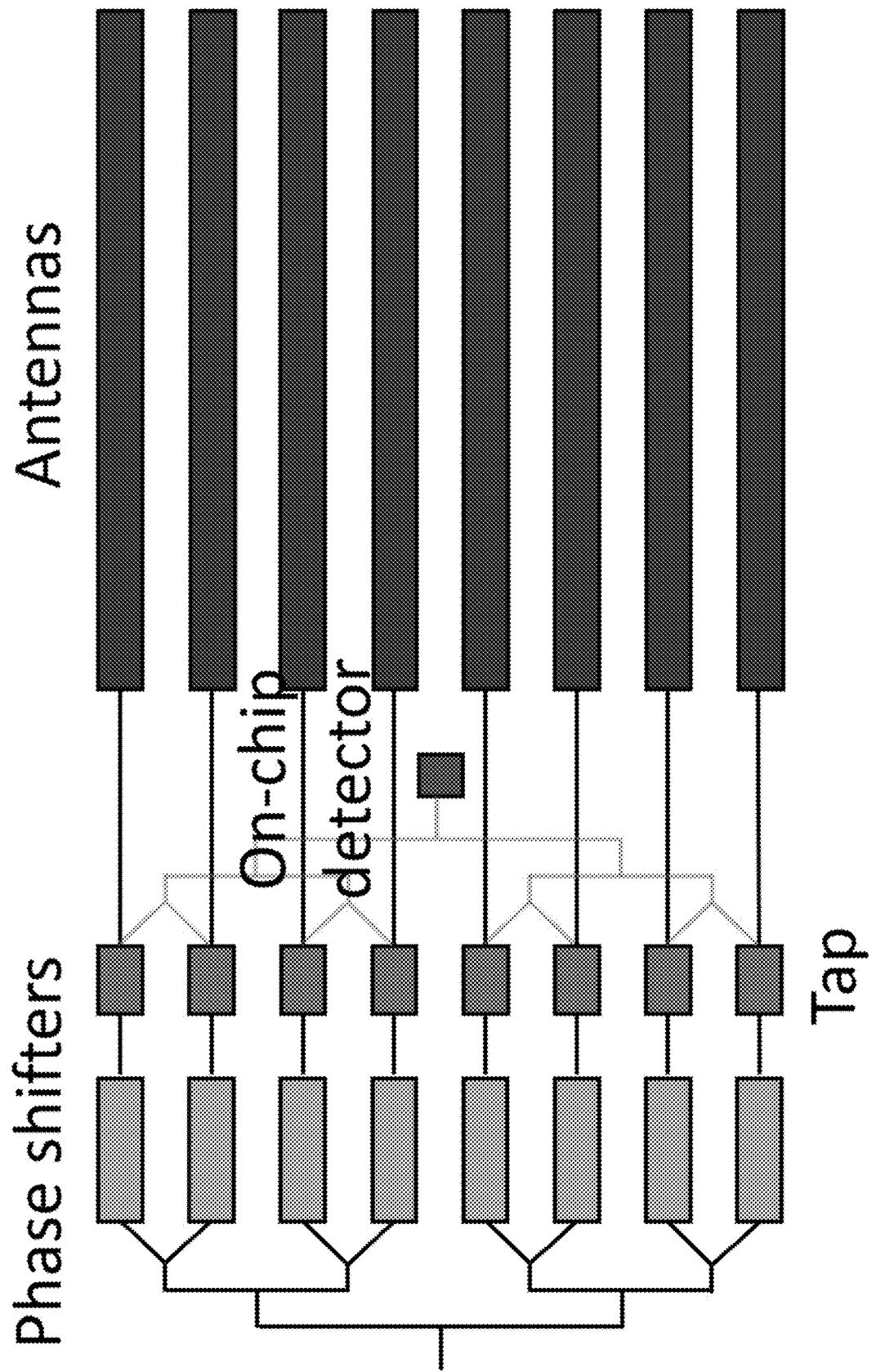
FIG. 2 is a schematic diagram showing an alternative illustrative OPA structure including on-chip detector and tap(s) according to aspects of the present disclosure.

FIG. 2 is a schematic diagram showing an alternative illustrative OPA structure including on-chip detector and tap(s) according to aspects of the present disclosure. As may be observed from this figure, the structure shown includes an array of individual taps which tap at least a portion of phase shifted light from each of the phase shifters. The tapped light is directed to an on-chip detector element where it is detected as an interference signal. As before, such interference signal includes light from all of the phase shifters. Advantageously optical power taps such as those shown may be formed with a directional coupler, multi-mode interference coupler, adiabatic coupler, or another device—as appropriate.

Figure 3:
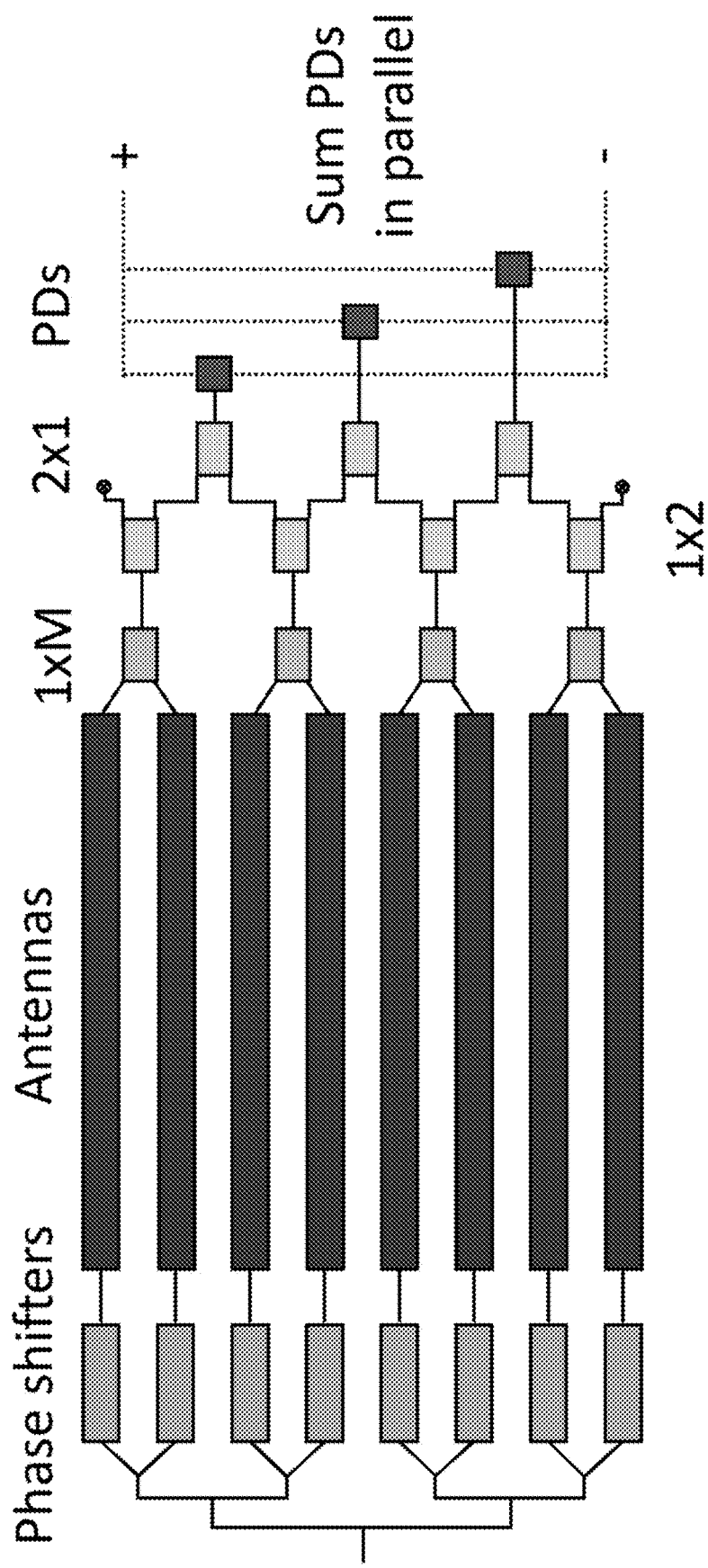
FIG. 3 is a schematic diagram showing an alternative illustrative OPA structure including output distribution network and multiple photodetectors according to aspects of the present disclosure.

FIG. 3 is a schematic diagram showing an alternative illustrative OPA structure including output distribution network having multiple individual photodetectors according to aspects of the present disclosure. In this illustrative configuration, the multiple photodetectors are electrically connected in parallel such that a single electrical signal is output from the multiple photodetectors and a single detector element is formed. Note that the distribution network optically connecting the multiple photodetectors to the array of antennas includes a number of 1×M and 2×1 structures, those skilled in the art will appreciate that the disclosure is not so limited.

Also note that, as before, individual optical path length(s) between the antennas and the individual one of the multiplicities of the photodetector are all equal. Accordingly, any output network structure/configuration providing this equal path-length characteristic and optically connecting the antennas to the photodetectors is contemplated. Note further that each of the individual photodetectors is associated with particular collection of the antennas, and that in the configuration shown, each of the individual photodetectors receives as input light transmitted by an equal number of individual antennas.

Figure 4:
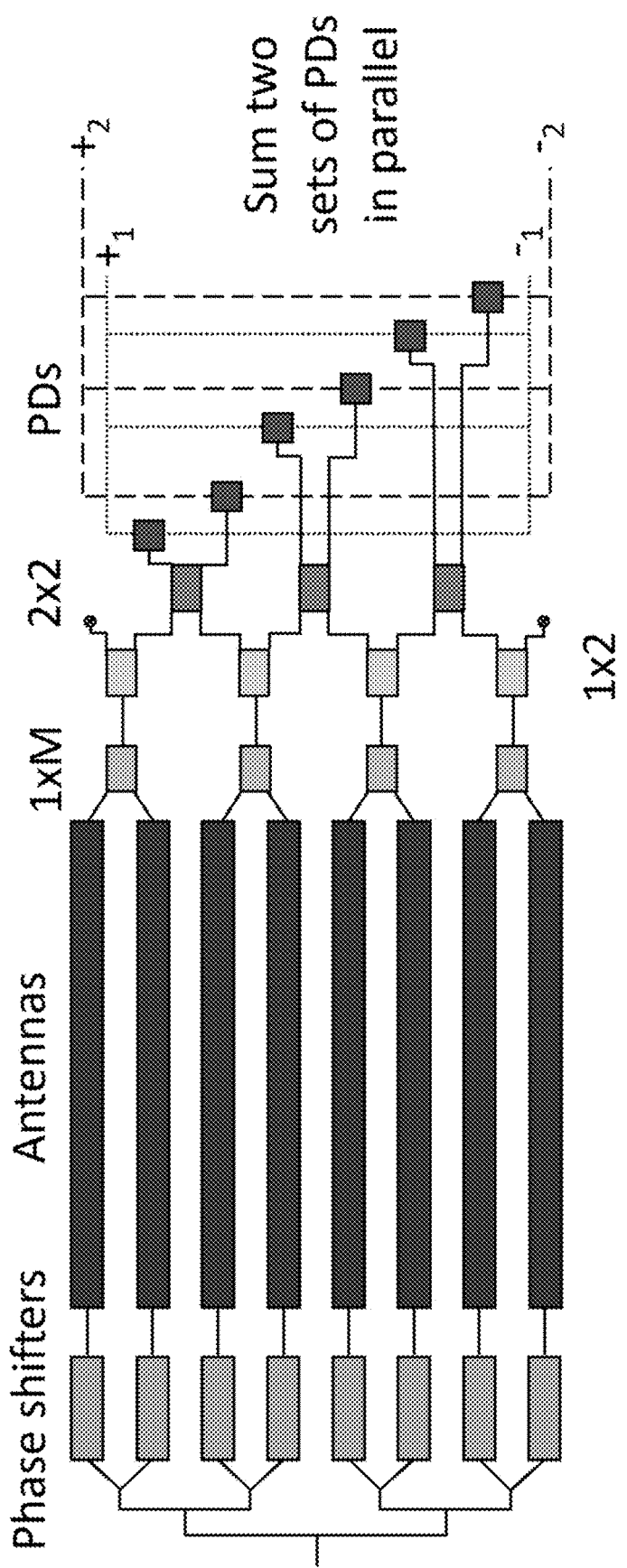
FIG. 4 is a schematic diagram showing an another alternative illustrative OPA structure including output distribution network and multiple photodetectors according to aspects of the present disclosure.

FIG. 4 is a schematic diagram showing an another alternative illustrative OPA structure including an output distribution network and multiple photodetectors according to aspects of the present disclosure. In this illustrative configuration, the individual photodetectors are grouped into sets of photodetectors and the sets are summed in parallel. We note that while in this illustrative configuration shown two sets are shown, such is for illustrative purposes only and a greater number of sets are contemplated in other configurations. However, two sets are useful for quadrature detection of the coherent measurement.

Up to this point, we have disclosed and described structures and operations that generally involve the transmission of light output by phase shifting elements and transmitted to one or more photodetectors where it is detected as an interference signal(s). As we shall now describe, alternative structures according to the present disclosure may advantageously employ reflective rather than transmissive elements.

Figure 5:
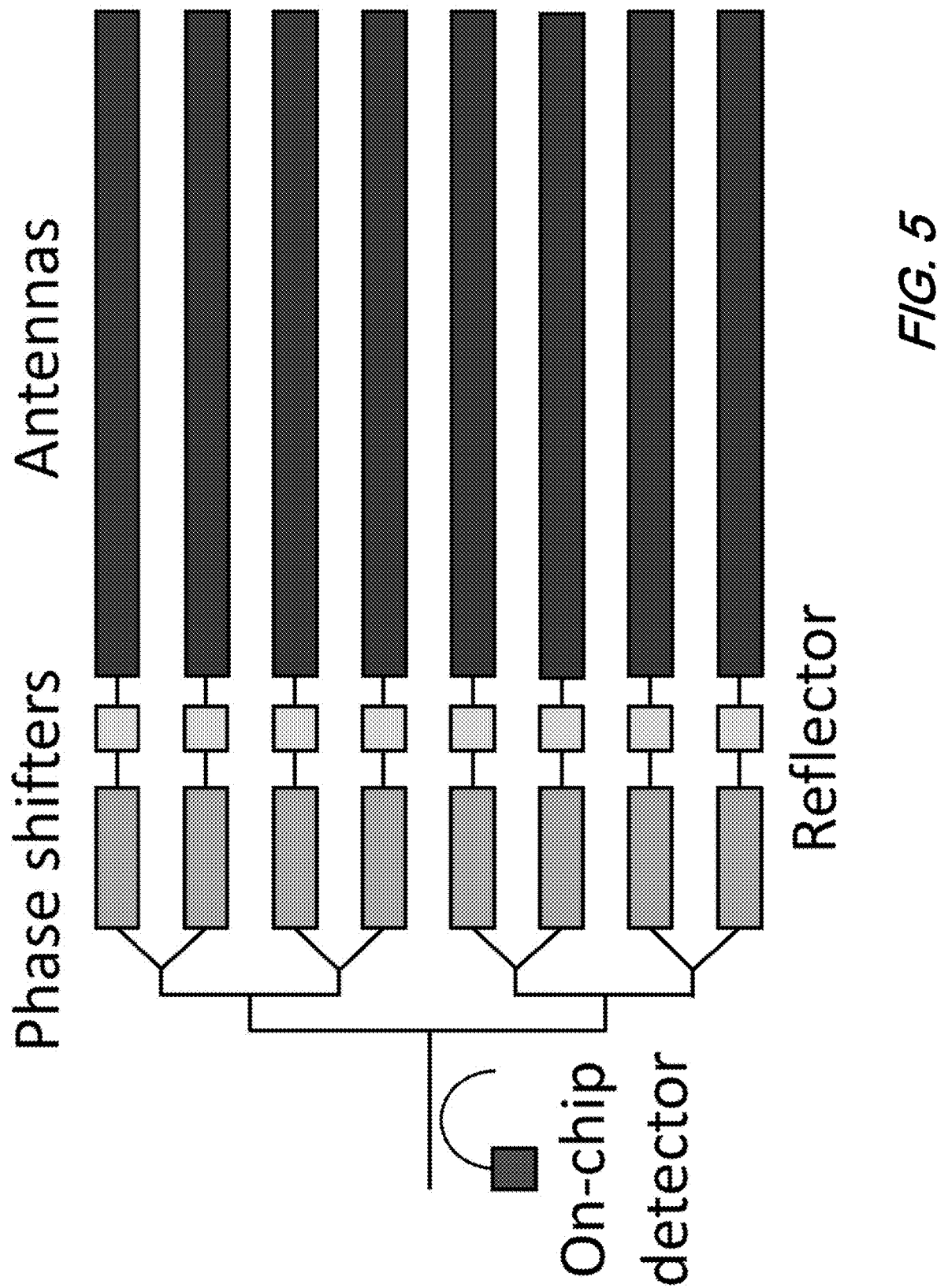
FIG. 5 is a schematic diagram showing an illustrative OPA structure including an on-chip detector and reflector(s) positioned between phase shifters and antennas according to aspects of the present disclosure.

FIG. 5 is a schematic diagram showing an illustrative optical phased array (OPA) structure including an on-chip detector and reflector(s) positioned between phase shifters and antennas according to aspects of the present disclosure. In this configuration shown, at least a portion of the light output from each of the individual phase shifters is reflected back through the phase shifter and subsequently directed to a detector as an interference signal. A tap coupler may be utilized to direct a portion of the reflected light into the detector. As will be readily appreciated by those skilled in the art, such reflected light passes through its respective phase shifter twice and subsequently distributed to the detector by the input distribution network. Advantageously, such configuration requires only a single distribution network that both distributes light to the array of phase shifters and the reflected light back to the detector element. Note that reflections can be generated with any of a number of known reflectors/structures including discontinuities in waveguides, resonators, Bragg gratings, fixed reflectors, tunable reflectors, liquid crystals, or other structures as appropriate.

Those skilled in the art will understand and appreciate that yet another way to generate a reflection is with commonly used grating-based antennas at the wavelength that satisfies the Bragg condition. Advantageously, in such a configuration the antennas act as a reflector element.

Figure 6:
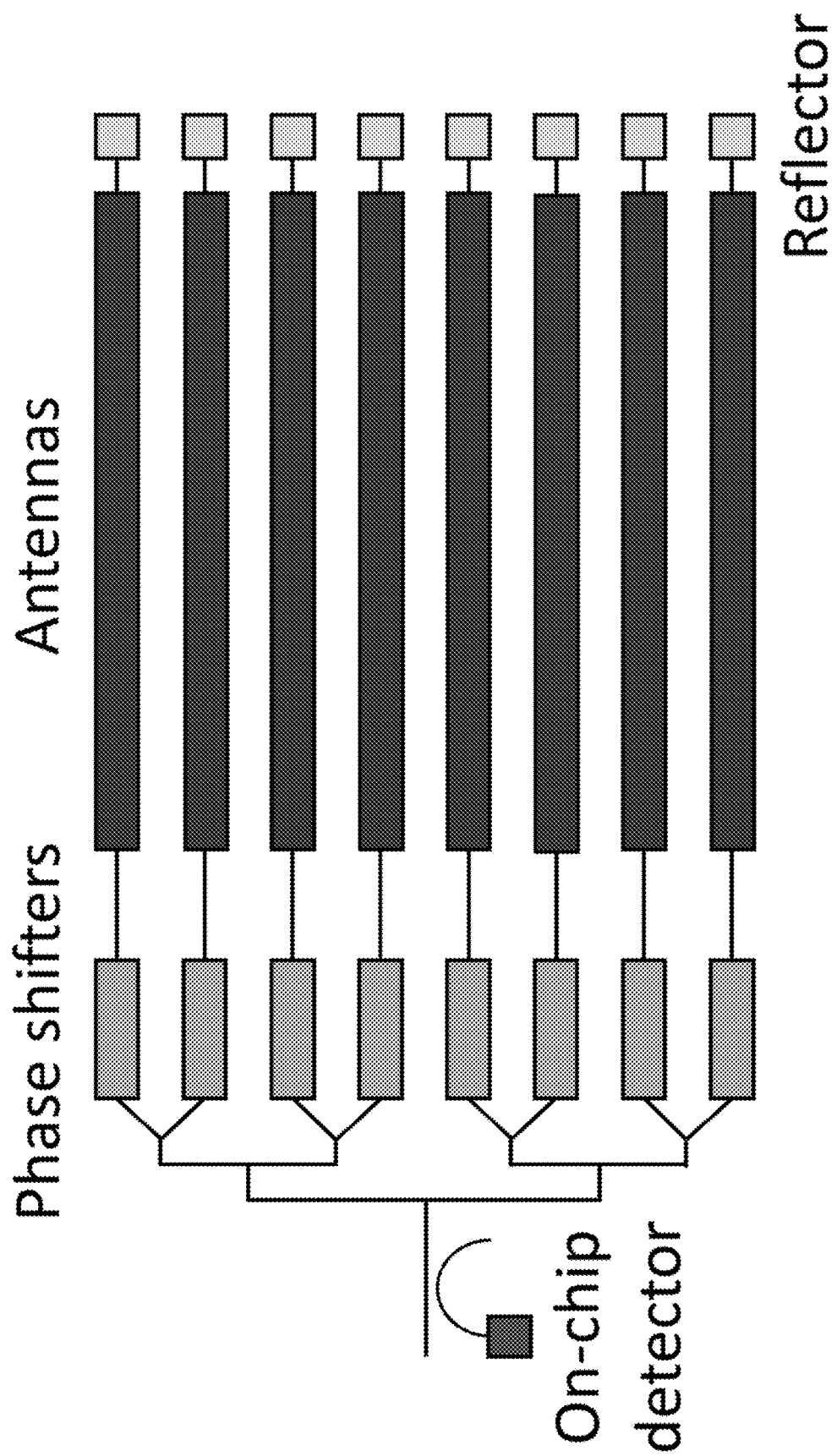
FIG. 6 is a schematic diagram showing an alternative illustrative OPA structure including an on-chip detector and reflector(s) positioned after antennas according to aspects of the present disclosure.

FIG. 6 is a schematic diagram showing an alternative illustrative optical phased array (OPA) structure including an on-chip detector and reflector(s) positioned after antennas according to aspects of the present disclosure. Those skilled in the art will appreciate that a variety of reflector positions may be employed in structures according to aspects of the present disclosure. As shown illustratively, reflector elements in this figure are positioned in an optical path after the antennas. As a result, light transmitted by the antennas is reflected back though the antennas, through the phase shifters and subsequently directed to the detector element as an interference signal.

Figure 7:
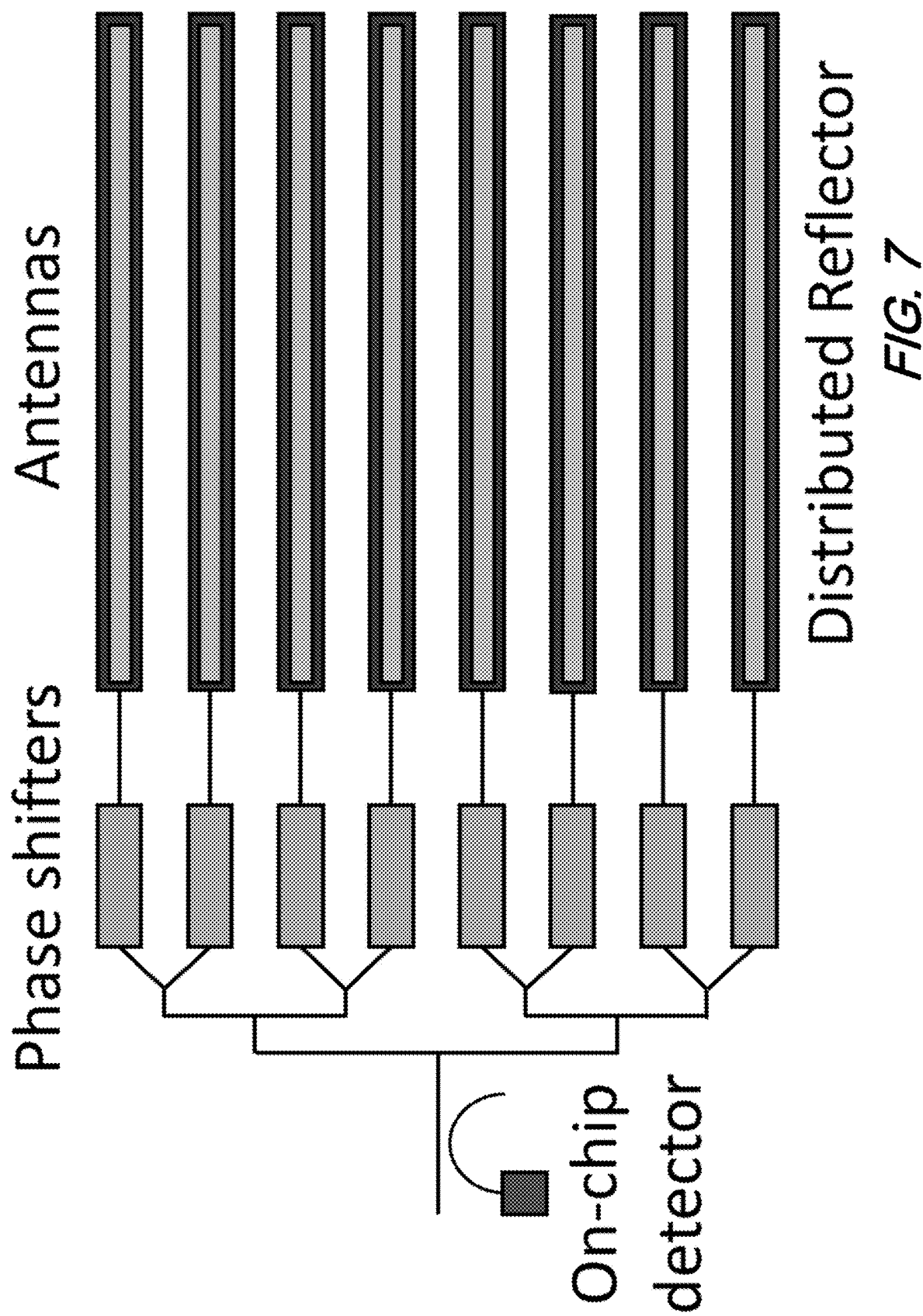
FIG. 7 is a schematic diagram showing an illustrative OPA structure including an on-chip detector and distributed reflector(s) according to aspects of the present disclosure.

FIG. 7 is a schematic diagram showing an illustrative optical phased array (OPA) structure including an on-chip detector and distributed reflector(s) according to aspects of the present disclosure. In this illustrative configuration shown, the antennas are configured to serve as distributed reflector and may be advantageously be wavelength-dependent.

Figure 8:
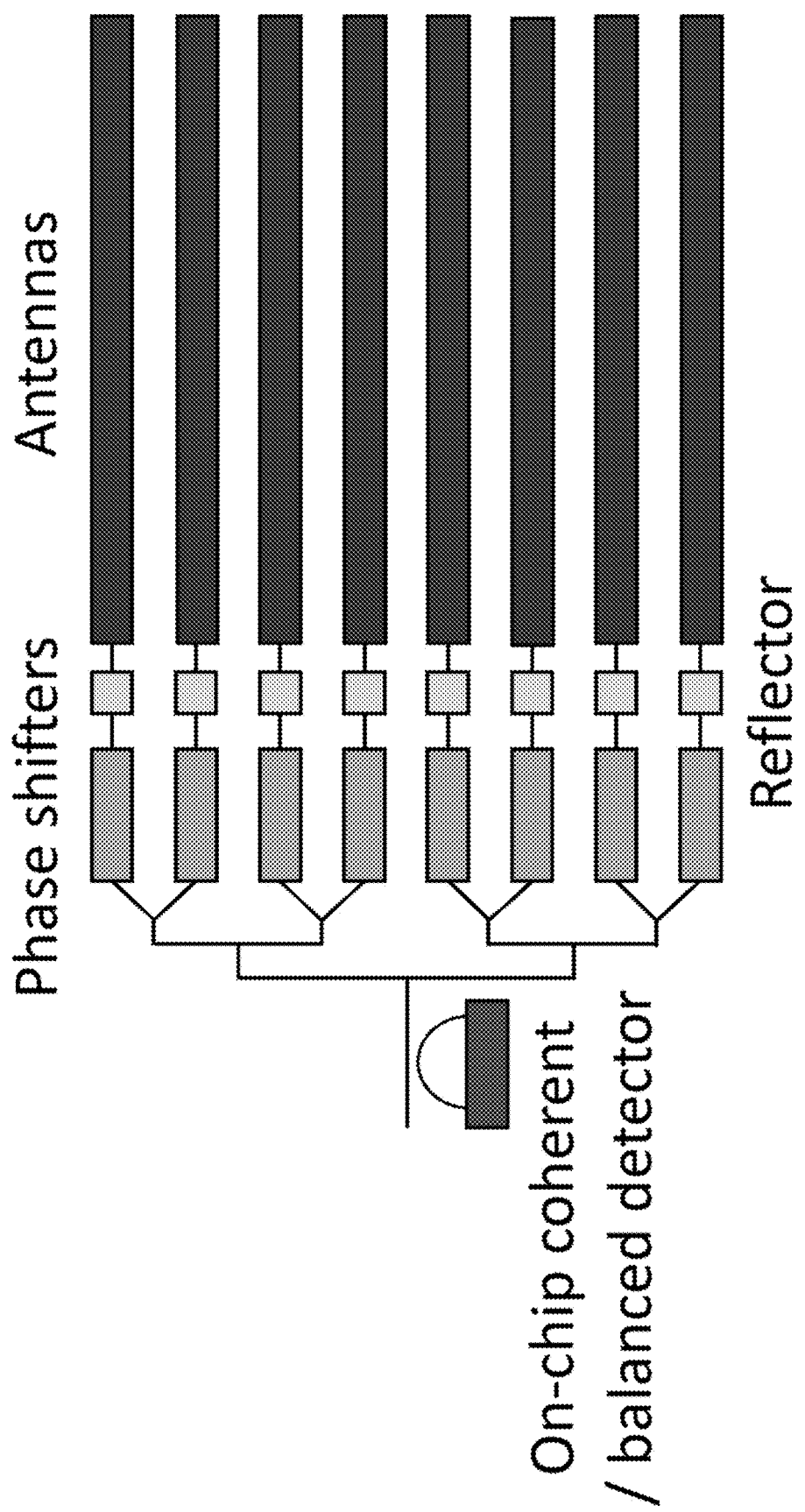
FIG. 8 is a schematic diagram showing an illustrative OPA structure including an on-chip coherent/balanced detector and reflector(s) according to aspects of the present disclosure.

FIG. 8 is a schematic diagram showing an illustrative optical phased array (OPA) structure including an on-chip coherent/balanced detector and reflector(s) according to aspects of the present disclosure. Similar to the structures disclosed earlier, this figure shows an illustrative structure including a coherent detector that advantageously will include a local oscillator.

Figure 9:
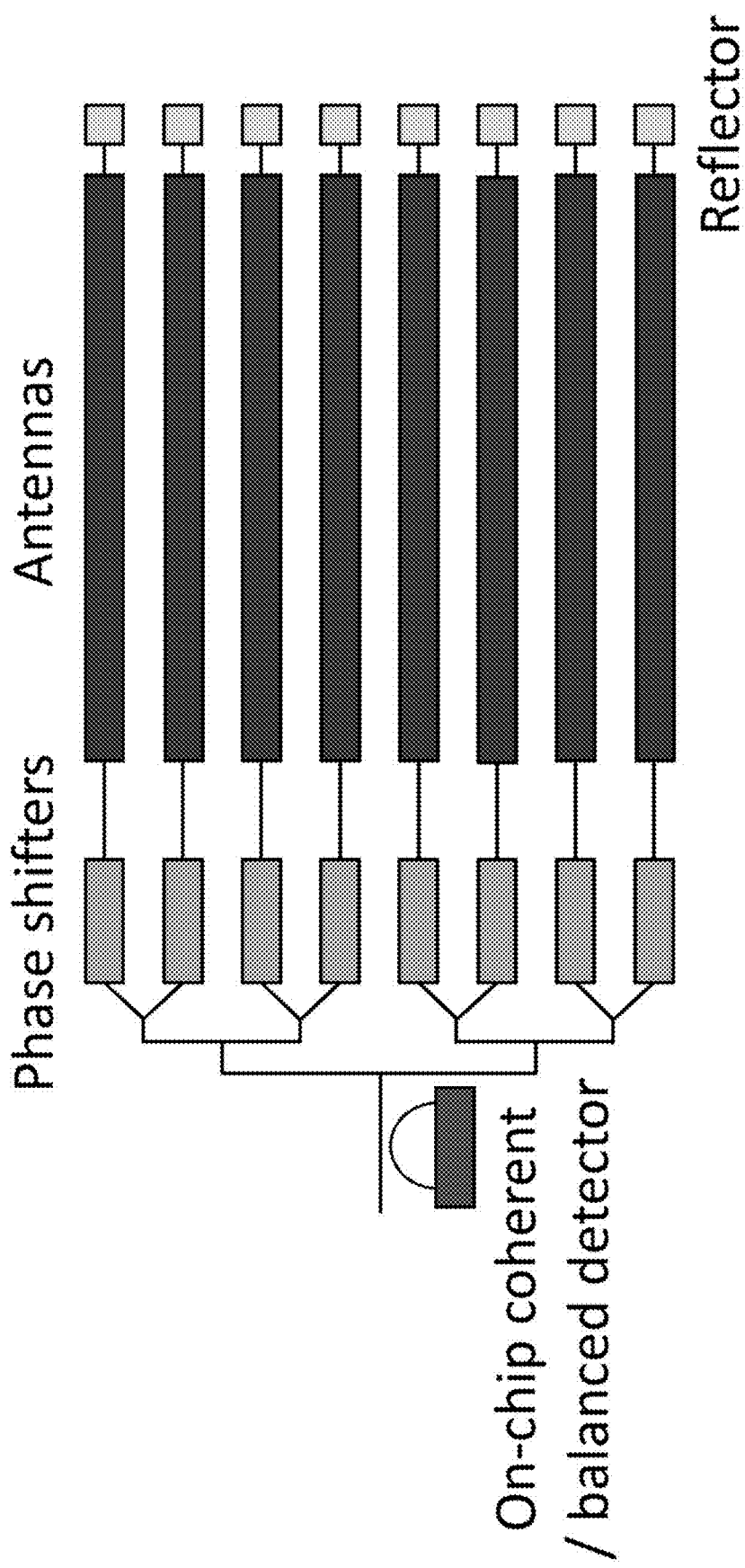
FIG. 9 is a schematic diagram showing an illustrative OPA structure including an on-chip coherent/balanced detector and reflector(s) positioned after antennas according to aspects of the present disclosure.

FIG. 9 is a schematic diagram showing an illustrative optical phased array (OPA) structure including an on-chip coherent/balanced detector and reflector(s) positioned after antennas according to aspects of the present disclosure.

Figure 10:
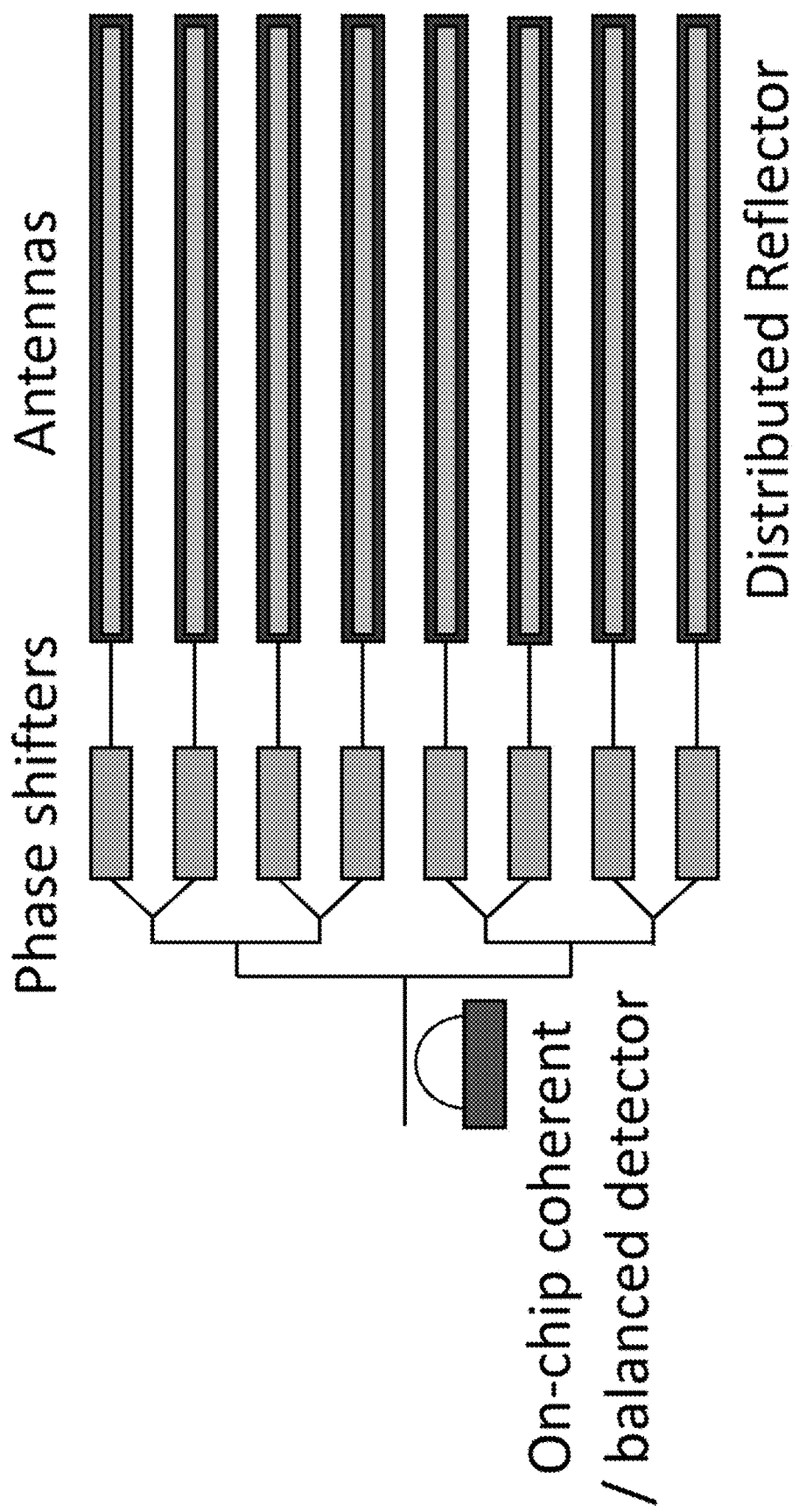
FIG. 10 is a schematic diagram showing an illustrative OPA structure including an on-chip coherent/balanced detector and distributed reflector(s) according to aspects of the present disclosure.

FIG. 10 is a schematic diagram showing an illustrative optical phased array (OPA) structure including an on-chip coherent/balanced detector and distributed reflector(s) according to aspects of the present disclosure.

At this point those skilled in the art will understand and appreciate that interference as employed in the present disclosure may advantageously be measured at any point after traversing phase shifting elements. And unlike the prior art, systems, methods, and structures according to the present disclosure do not require or employ time-consuming iterative optimization procedures and instead—directly measures phase offset of each element in a single predetermined pass along with a phase response of phase shifters as a function of a control signal (also denoted as "phase function"). Finally, and of particular distinction, only a single interference measurement of all antennas is required, that is, a single pixel detector, therefore, multiple detector elements measuring the interference of adjacent antennas or groups of antennas are unnecessary.

After the phase offsets and phase responses of each element are measured, the optical phased array can easily be set to any element phase distribution to perform beam steering or beam forming as particular application(s) dictate. Finally, and in addition to the phase vs. control signal relationship(s), calibration according to the present disclosure allows extraction of intensity change vs. control signal by comparison of the interference with an expected sinusoidal shape of the interference.

To more thoroughly understand our disclosed method, consider an optical power measurement, S, of an interference of N optical elements having amplitude $a_n$ (real valued) and some unknown, but desired, phase offset, $b_n$. A portion of $b_n$ is inherent to a device due to imperfections but can also have a contribution due to the interference measurement technique, such as a far field measurement not at 0°.

For generality, the tunable phase of the elements can be set to any initial known voltage (or control signal), $v_n$, but the resulting phase, $\theta_n(v_n)$, can be unknown. The initial measurement S is the following:

$$S = \left| \sum_{n=1}^{N} a_n e^{i(b_n + \theta_n(v_n))} \right|^2 = |\tilde{C}|^2$$

where, i is the imaginary unit and $\tilde{C}$ is the initial complex field value of the measurement. If $v_m$, the voltage of element m, is changed then the resulting power measurement, $S_m(v_m)$, can be written as:

$$S_m(v_m) = \left| a_m e^{i(b_m + \theta_m(v_m))} + \left( \sum_{n=1}^{m-1} a_n e^{i(b_n + \theta_n(v_n))} + \sum_{n=m+1}^{N} a_n e^{i(b_n + \theta_n(v_n))} \right) \right|^2 =$$

$$\left| a_m e^{i(b_m + \theta_m(v_m))} + C_m \right|^2$$

Thus $S_m(v_m)$ can be seen as an interference measurement of element m against some reference signal $C_m$. For large N, $\tilde{C}$ is near equal to $C_m$, that is, taking element m out of the interference does not greatly change the magnitude or phase of the initial complex field value of the measurement and, when changing m, each antenna coherent measurement is against a similar reference signal.

Figure 11:
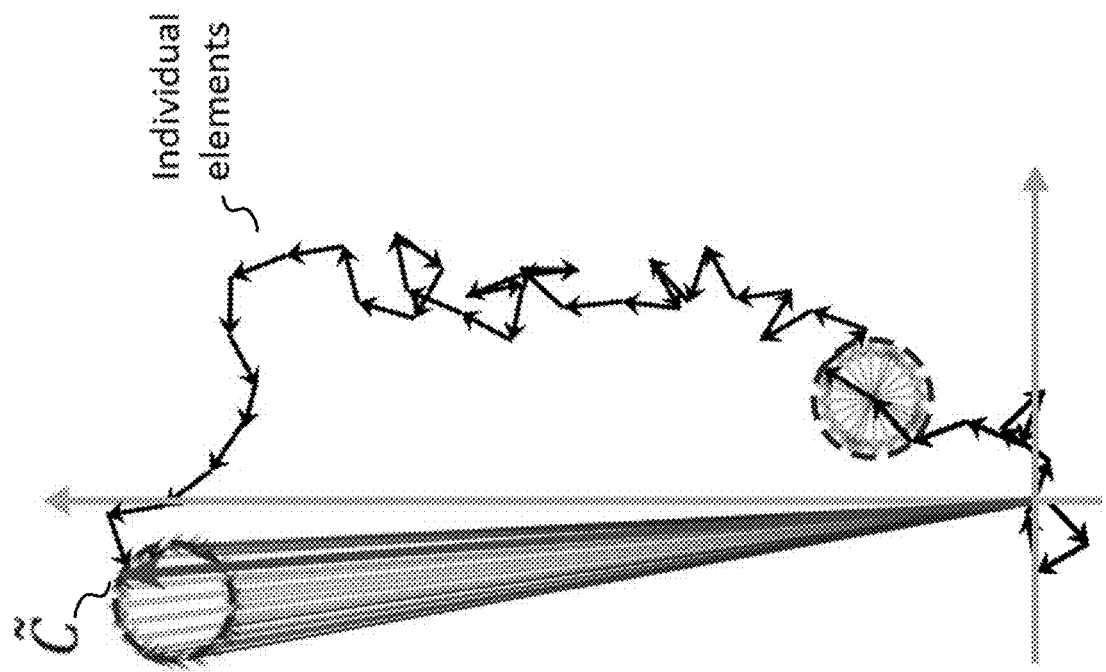
FIG. 11 is a plot showing the generation of a complex field valued interference signal with 64 elements according to aspects of the present disclosure.

FIG. 11 is a plot showing the generation of a complex field value with 64 elements according to aspects of the present disclosure. More specifically, FIG. 11 shows the value of $\tilde{C}$ after being generated from the sum of 64 elements. With a larger number of elements, $\tilde{C}$ has the possibility of being larger and the individual contribution of each element becomes smaller.

Using the approximation $C_m \approx \tilde{C}$ allows us to simplify $S_m(v_m)$ to the following:

$$S_m(v_m) =$$
$$\left| a_m e^{i(b_m + \theta_m(v_m))} + C_m \right|^2 \approx \left| a_m e^{i(b_m + \theta_m(v_m))} + \tilde{C} \right|^2 = |\tilde{C}|^2 + a_m^2 + 2a_m|\tilde{C}|$$
$$\cos(\theta_m(v_m) + b_m - \angle \tilde{C}) \rightarrow \text{Fit sinusoid to get } 2a_m|\tilde{C}|, \theta m(vm), \text{ and } (b_m - \angle \tilde{C})$$

where $\angle \tilde{C}$ is the angle of the complex number $\tilde{C}$.

Here it is seen that $S_m(v_m)$ produces a sinusoid with a phase offset that is the difference of the initial desired phase offset of the optical element, $b_m$, and a constant phase value across all elements, $\angle \tilde{C}$. Furthermore, the phase response of the element as a function of voltage, $\theta_m(v_m)$, is also directly measured. If $\theta_m(v_m)$ is complex (has gain/attenuation), that can also be measured with this method. The relative amplitudes of the elements, $a_m$, are also compared.

Accordingly, fitting this sinusoid experimentally produces the relative phase offset, relative amplitude, and phase function of each element. Fitting can be performed with heuristic knowledge of the system to produce an accurate result. Furthermore, the phase shifters may also allow for measurement of the guided light power (such as leakage current in a PN junction). Using this knowledge in conjunction with this procedure allows for an accurate fitting of the complex value of $\theta_m(v_m)$.

By performing a single pass and measuring $S_m(v_m)$ for each element 1 to N, one learns the initial phase offset $b_m$ (with a constant of $\angle \tilde{C}$) of each optical element and the tunable phase function $\theta_m(v_m)$ as a function of voltage. If this voltage is set equal to the opposite of $(b_m - \angle \tilde{C})$, i.e. $\theta_m(\widetilde{v_m}) \equiv -b_m + \angle \tilde{C}$, then the interference measurement, S, is maximized and calibration is complete.

As may be appreciated, this interference measurement according to the present disclosure is general and can be achieved in numerous phased array configurations including those shown and described herein. One important aspect of the interference measurement is that it relates to a desired phase distribution of the optical elements. That is, producing the maximum of this interference measurement produces the desired phase distribution or leads to the desired phase distribution through a known phase transformation. Because the phase shifter response, $\theta_m(v_m)$, is measured for each optical element, beam steering or beam forming from the initial desired phase distribution to another phase distribution can easily be achieved after calibration. It is also important to note that the mathematical discussions herein are for the phase control of each individual element, however, this procedure can also be performed with phase shifters that control groups of elements.

Figure 12A:
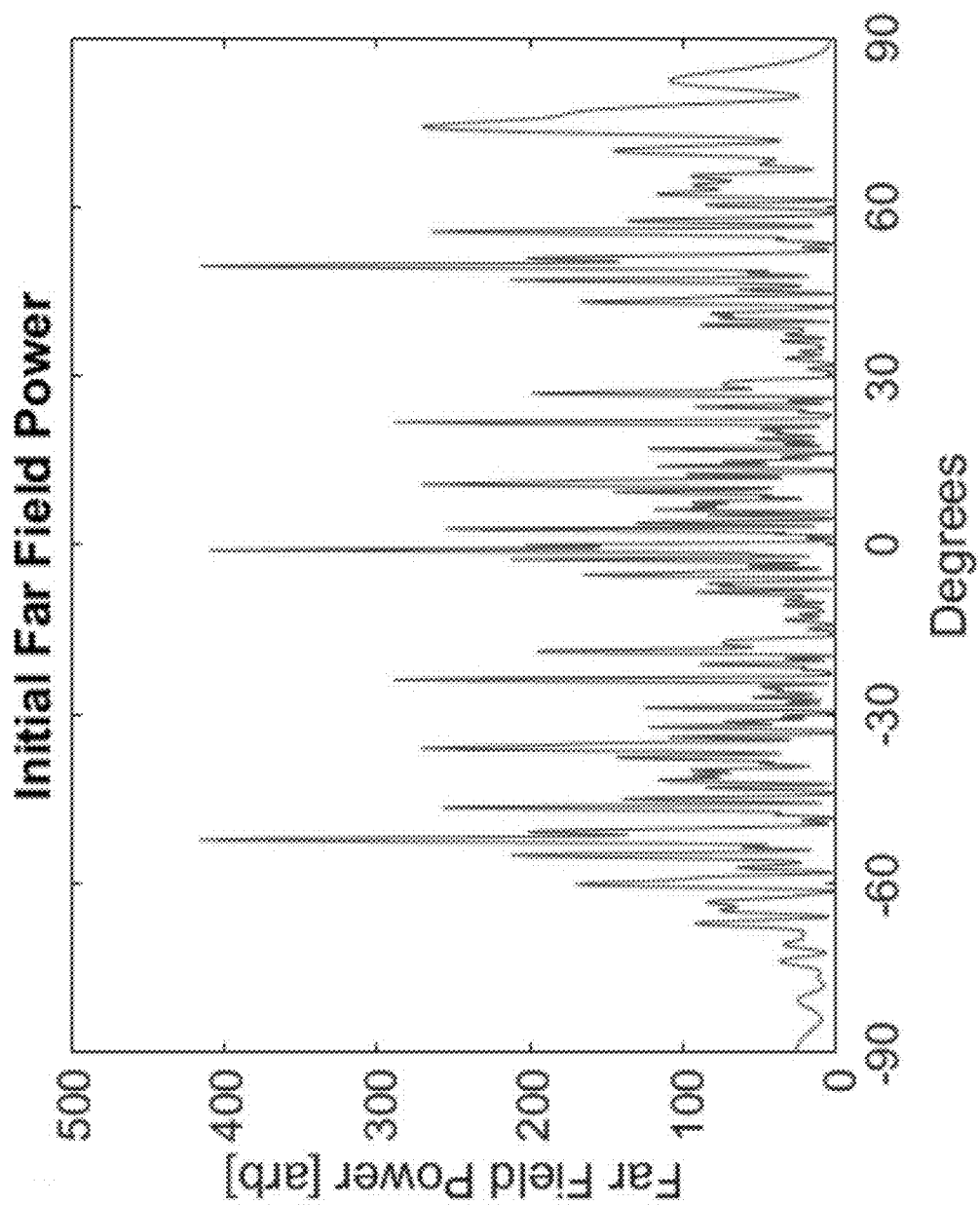
FIG. 12(A) is a plot showing initial angular emission far field power vs. far field degrees of a one-dimensional 64-element optical phased array with a randomized phase front according to aspects of the present disclosure.

We now provide an illustrative example of a calibration of a one-dimensional 2 µm-pitch, 64-element optical phased array at a wavelength of $\lambda=1.55$ µm. The phase offset of the elements are set to a uniformly random phase distribution within 0-2π. The resulting far field is shown in in FIG. 12(A).

Figure 12B:
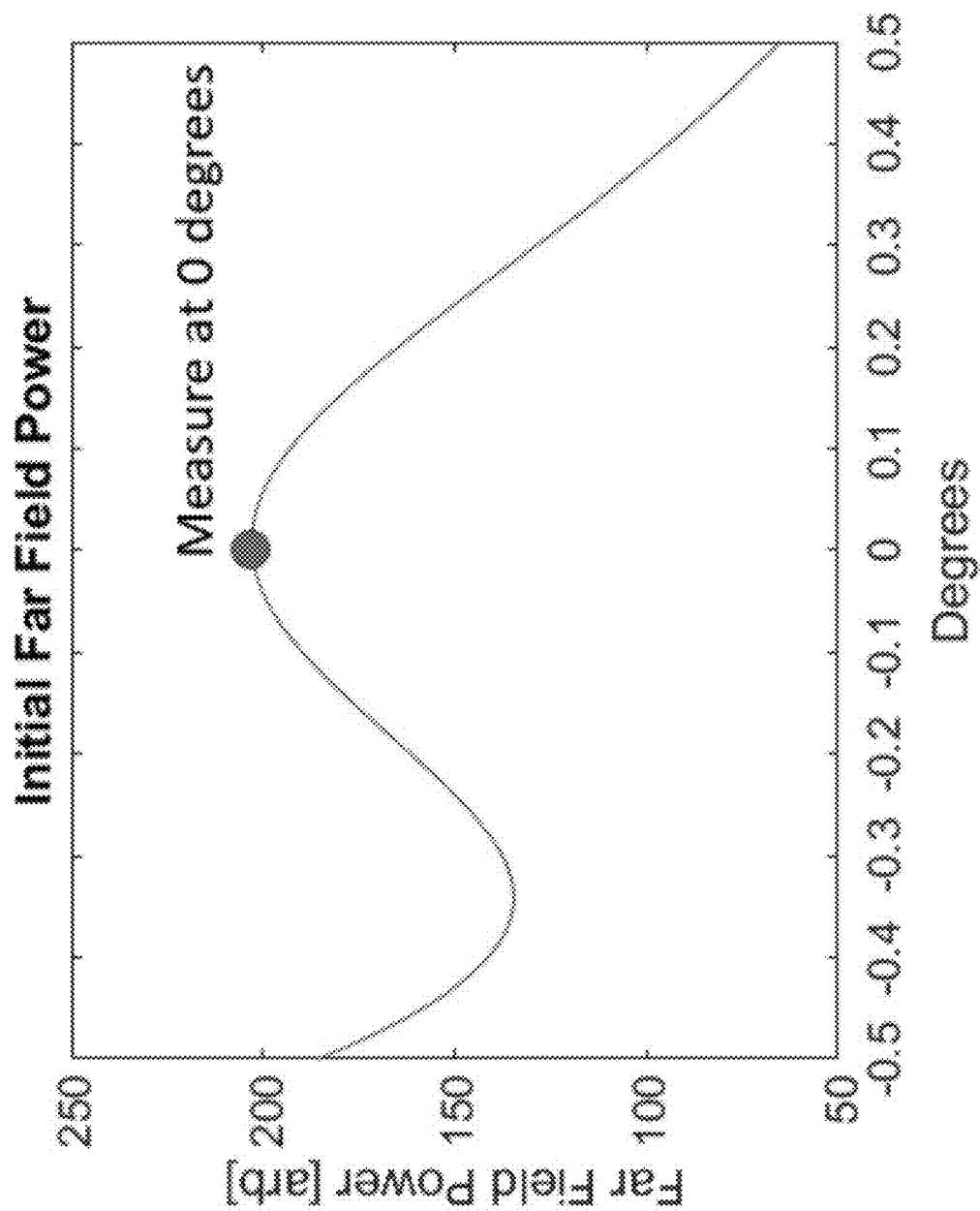
FIG. 12(B) is a zoom-in of the plot showing initial far field power vs. far field degrees near 0° indicating where an interference measurement will take place according to aspects of the present disclosure.
Figure 13A:
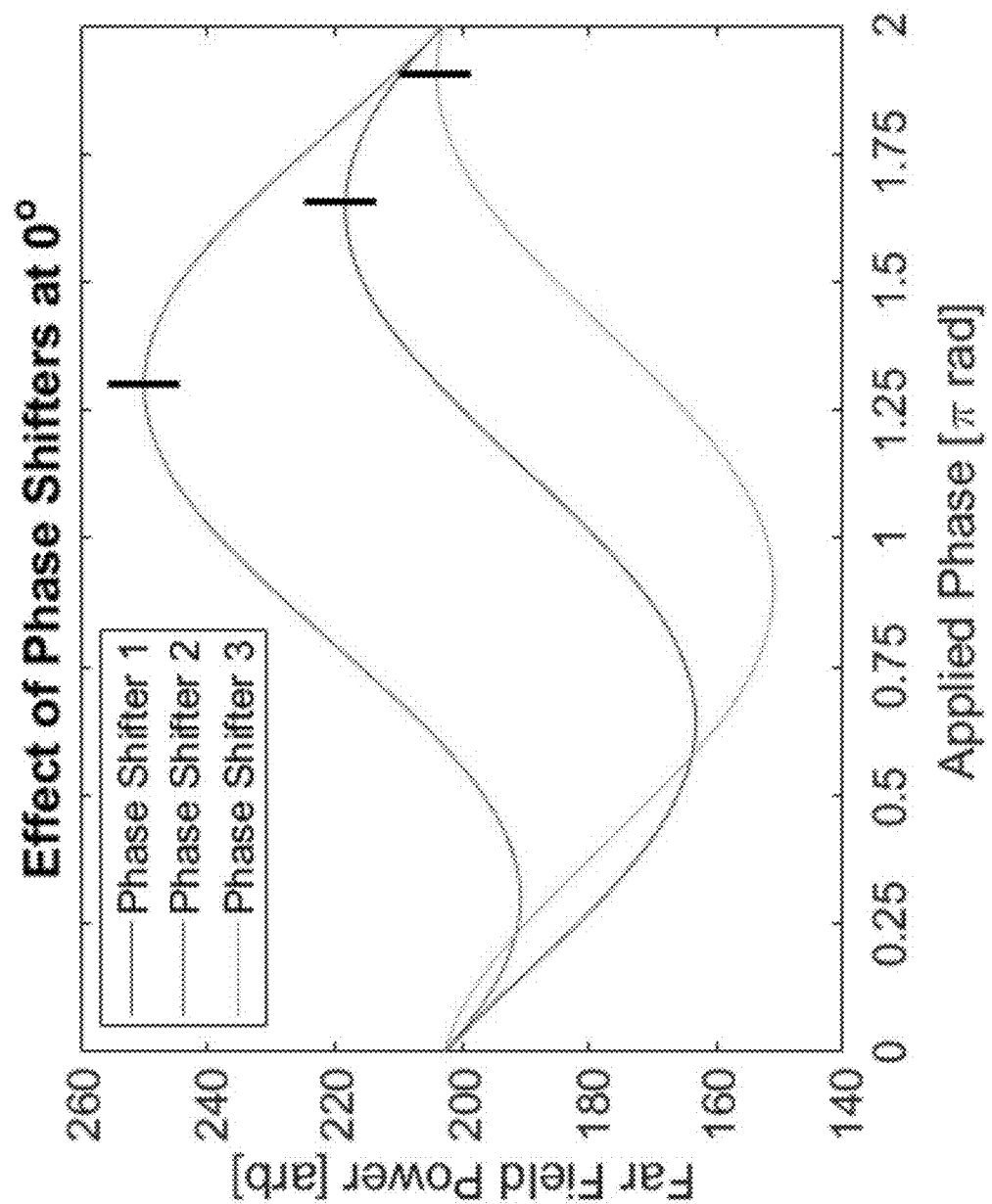
FIG. 13(A) is a plot showing the effect of the phase shifters at 0° of far field power vs. applied phase when sweeping optical phase shifters for 3 illustrative phase shifters according to aspects of the present disclosure.
Figure 13B:
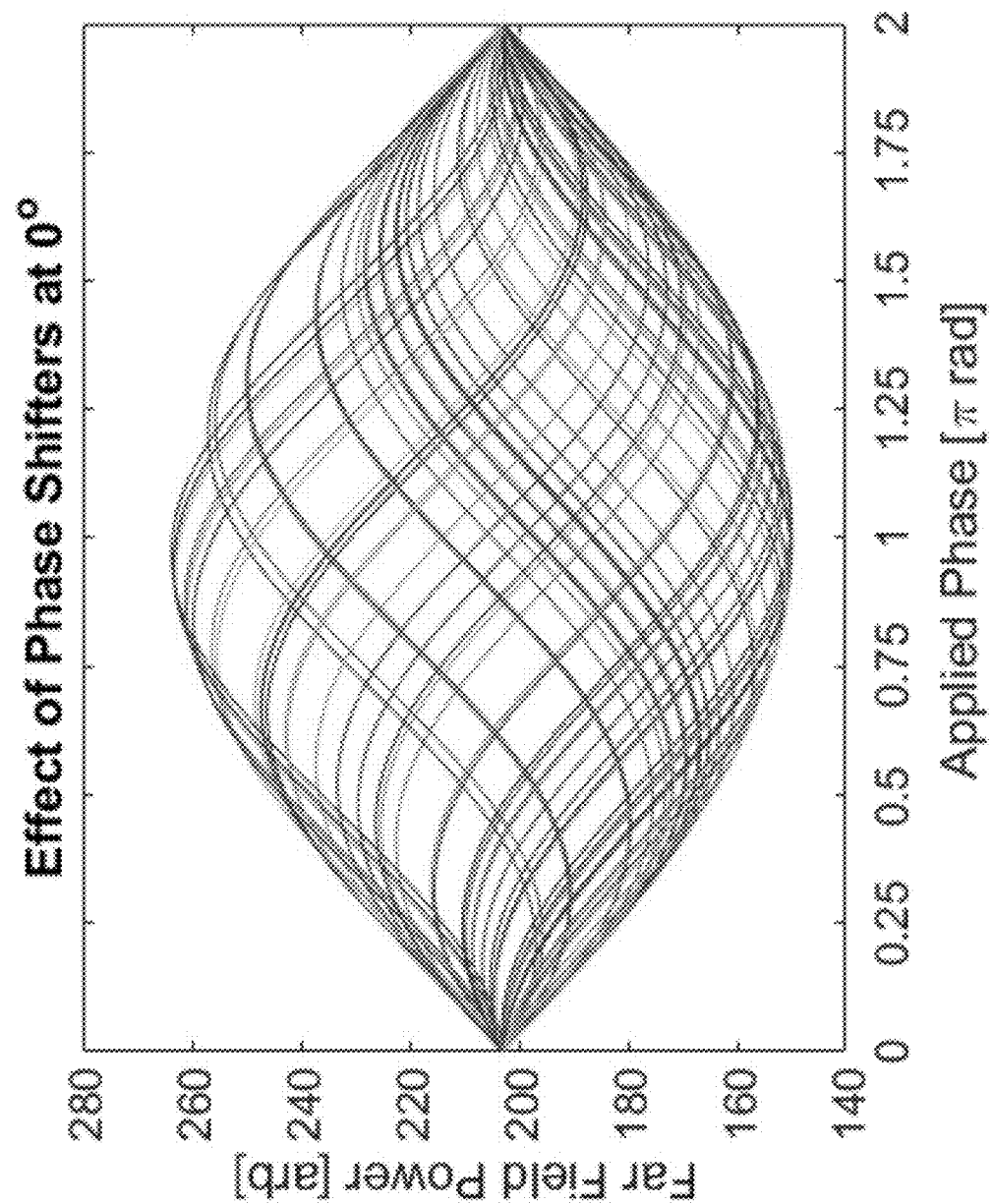
FIG. 13(B) is a plot showing effect of phase shifters at 0° of far field power vs. applied phase when sweeping optical phase shifters for 64 illustrative phase shifters according to aspects of the present disclosure.

For simplicity the interference measurement is the center point of the far field at 0° (FIG. 12(B)). The power at this point when sweeping the first three phase shifters is shown in FIG. 13(A). Sinusoids are generated with phase offsets that are approximately equal to $b_m - \angle \tilde{C}$. FIG. 13(B) shows all the sinusoids generated when sweeping the 64 elements on a single plot.

Figure 14A:
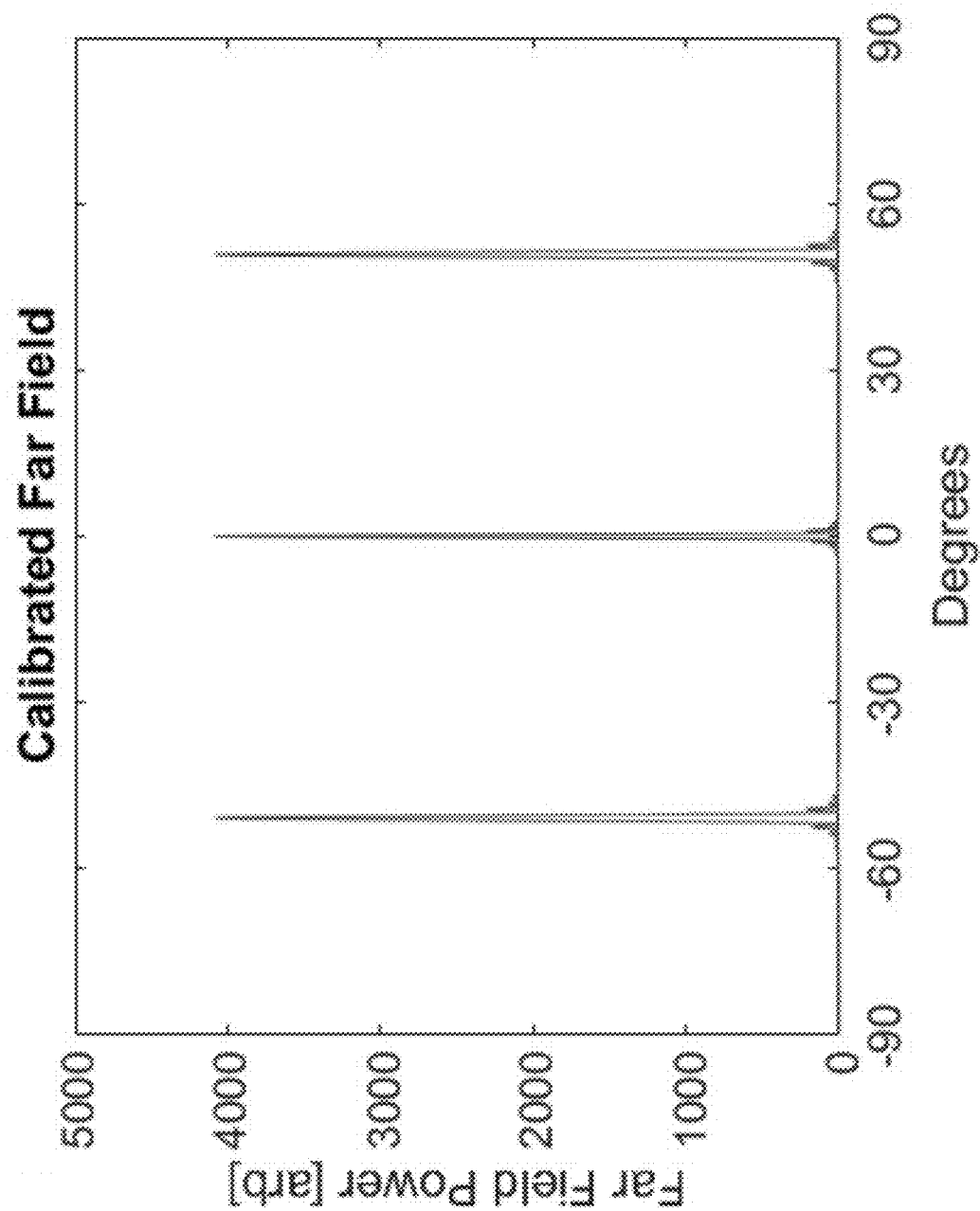
FIG. 14(A) is a plot showing far field degrees vs far field power of a calibrated illustrative optical phased array according to aspects of the present disclosure.

The sinusoids shown in FIG. 13(B) have theoretical phase offsets of $b_m - \angle \tilde{C}$. When setting the phase shifters to the opposite of the fitted offset value, the far field is altered to be what is shown in FIG. 14(A). The optical phased array is now calibrated to maximize the interference measurement which is the power at 0°.

Figure 14B:
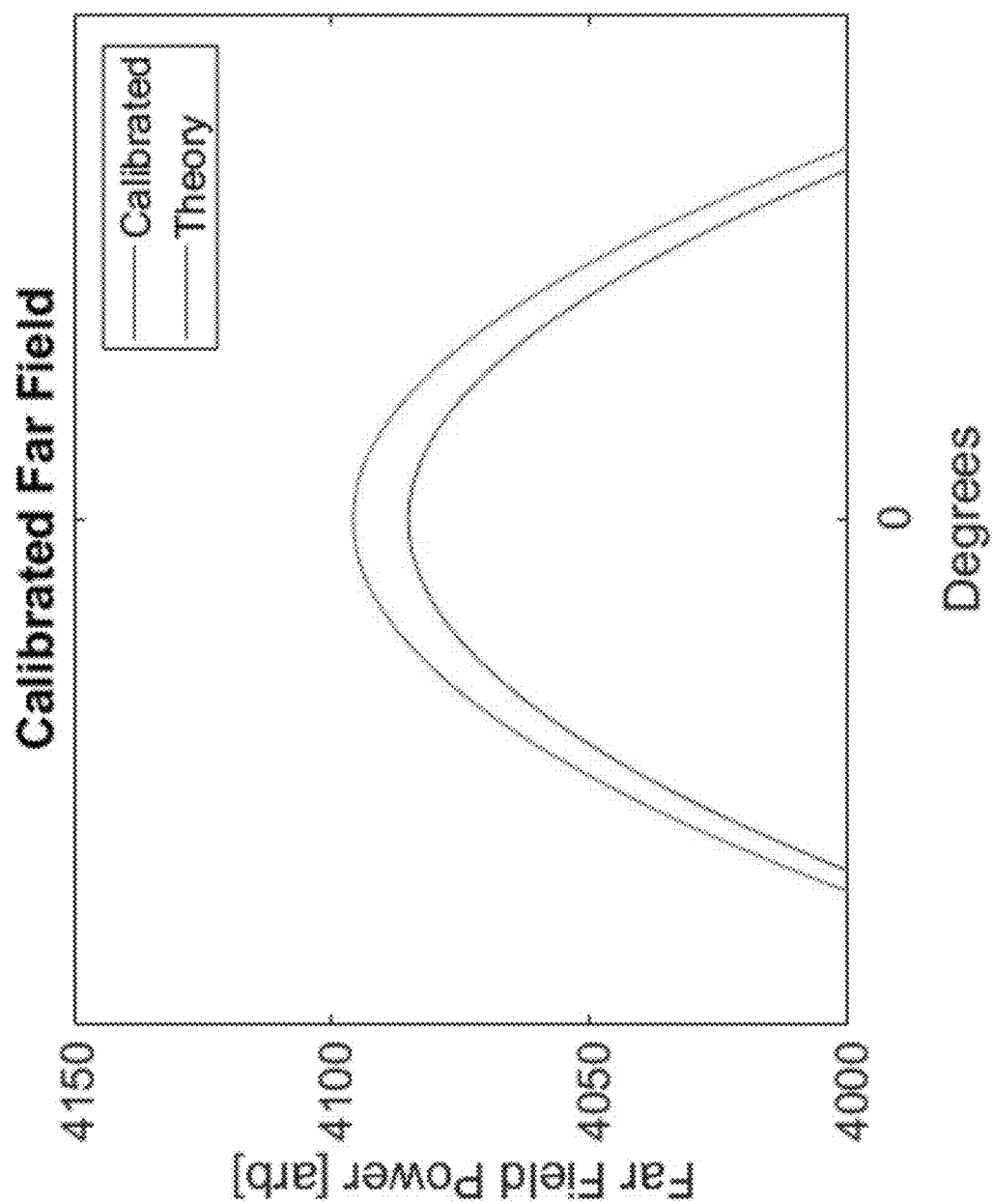
FIG. 14(B) is a zoom-in of the plot showing calibrated far field degrees vs far field power of calibrated illustrative optical phased array according to aspects of the present disclosure.

FIG. 14(B) shows a zoom-in at 0° and plots the theoretical maximum far field at this location. The calibrated optical phased array has less than 0.05 dB loss compared to the theoretical maximum.

Figure 15:
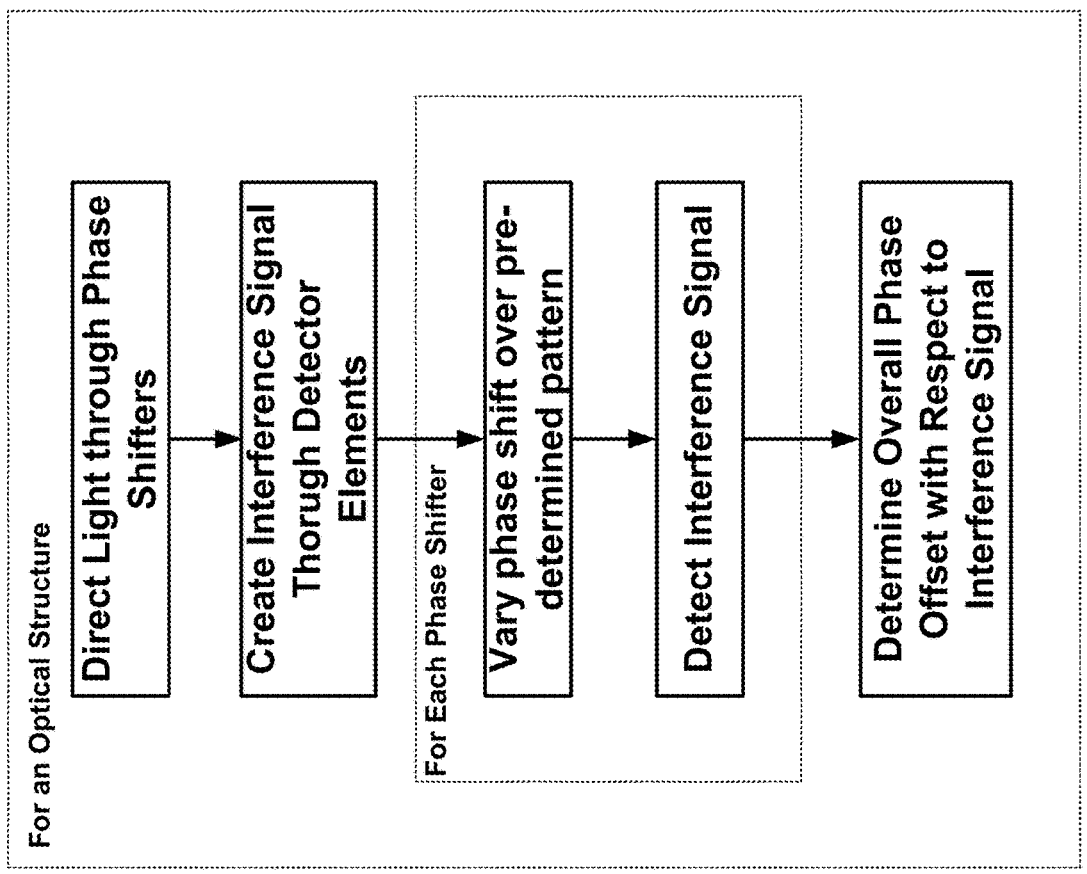
FIG. 15 is a flow diagram illustrating an illustrative calibration method for optical phased arrays according to aspects of the present disclosure.

We may further understand the generalized calibration procedure with reference to a flow diagram illustrated in FIG. 15. As shown in that figure, for an optical structure including an optical phased array, for each individual phase shifter—the phase shift is varied over a pre-determined pattern while detecting an interference signal for that structure. From such detections, an overall phase offset with respect to the interference signal is determined. Note that such method/procedure according to the present disclosure may be advantageously modified such that groups of phase shifters are varied instead of individual ones. With such operation, the phase shifters are varied at different frequencies; and a phase offset of each frequency component in the interference signal may advantageously be determined.

At this point, while we have presented this disclosure using some specific examples, those skilled in the art will recognize that our teachings are not so limited. Accordingly, this disclosure should be only limited by the scope of the claims attached hereto.

The invention claimed is:

1. An optical structure comprising:
  a substrate upon which is formed;
    an array of optical phase shifters;
    an array of optical antennas in optical communication with the array of optical phase shifters;
    an output optical distribution network in optical communication with the array of optical antennas; and
    a detector element in optical communication with the output optical distribution network;
  wherein said optical structure is configured such that light traversing the optical phase shifters is phase shifted, the phase shifted light is directed to the optical antennas where at least a portion is transmitted therethrough, the transmitted light from all of the phase shifters is directed to the output optical distribution network and subsequently to the detector element which detects the transmitted phase shifted light as an interference signal, said interference signal including light from all of the phase shifters in the array of optical phase shifters, wherein individual optical paths between the optical antennas and the detector element are all equal in length.

2. The optical structure of claim 1, wherein the detector element comprises a plurality of individual detectors.

3. The optical structure of claim 2, wherein the plurality of individual detectors is electrically connected in parallel.

4. The optical structure of claim 2, wherein the plurality of individual detectors is arranged in sets of multiple detectors, each set including the same number of individual detectors, and each set being electrically connected in parallel.

5. The optical structure of claim 4, wherein there are two sets of multiple detectors electrically connected in parallel.

6. The optical structure of claim 2, wherein each one of the individual detectors receives light transmitted through predetermined ones of the array of optical antennas.

7. The optical structure of claim 6, wherein the number of predetermined ones of the array of optical antennas transmitting light to an individual one of the detectors is the same for all of the individual detectors in the plurality of detectors.

8. The optical structure of claim 1, further comprising:
  an input distribution network formed upon the substrate and in optical communication with the array of optical phase shifters, said input distribution network configured to receive light from a source and distribute the received light to the array of optical phase shifters.

9. The optical structure of claim 1, wherein determined phase offsets for the structure are valid over a wide band of wavelengths.

10. An optical structure comprising:
  a substrate upon which is formed;
    an input optical distribution network;
    an array of optical phase shifters in optical communication with the input optical distribution network;
    an array of optical antennas in optical communication with the array of optical phase shifters;
    an array of reflector elements, in optical communication with the array of optical phase shifters,
    a detector element in optical communication with, and positioned in an optical path before the array of optical phase shifters;
  wherein said optical structure is configured such that light traversing the optical phase shifters is phase shifted, the phase shifted light is directed toward the array of reflector elements where at least a portion of the phase shifted light is reflected from at least one of the reflector elements back through the optical phase shifters and subsequently directed as an interference signal to the detector element which detects the interference signal.

11. The optical structure according to claim 10, wherein the interference signal includes light phase shifted by all the optical phase shifters in the array of optical phase shifters.

12. The optical structure according to claim 10, wherein the portions of light combined into the interference beam traverse a respective one of the optical phase shifters more than once.

13. The optical structure according to claim 10, wherein the detector element comprises a plurality of individual detectors.

14. The optical structure according to claim 13, wherein each one of the plurality of detectors receives light from predetermined ones of the array of optical reflectors.

15. The optical structure according to claim 10, wherein the detector element is a coherent detector having an input local oscillator.

16. The optical structure according to claim 15, wherein the coherent detector is a balanced detector or IQ detector.

17. The optical structure according to claim 10, wherein the array of optical reflectors is positioned in an optical path between the array of optical phase shifters and the array of optical antennas.

18. The optical structure according to claim 10, wherein the array of optical reflectors is positioned in an optical path after the array of optical antennas.

19. The optical structure according to claim 10, wherein the array of optical reflectors is formed in the array of optical antennas as a wavelength independent, distributed reflector in each.

20. The optical structure according to claim 10, wherein the array of optical reflectors comprises of the array of optical antennas wherein each individual one of the antennas exhibits a wavelength dependent Bragg condition.

21. A method for calibrating an optical structure, the optical structure comprising a substrate onto which is formed an array of phase shifting elements in optical communication with an array of emitting antenna elements, the method comprising:
   directing individual light signals through the phase shifting elements such that the individual light signals are phase shifted;
   directing the phased shifted light signals to the array of emitting antennas;
   for each individual one of the array of phase shifting elements,
      varying an amount of phase shift imparted by the individual phase shifting element over a pre-determined pattern, and
      detecting interference signals produced by the phase shifted light signals, wherein the varying is performed while detecting the interference signals, and wherein the interference signals include light from all of the phase shifting elements; and
   determining an overall phase offset for each phase shifting element with respect to at least one of the interference signals detected.

22. The method according to claim 21, further comprising:
   determining a phase vs. voltage relationship for each one of the individual phase shifting elements in the array.

23. The method according to claim 21, further comprising:
   determining an attenuation vs. voltage relationship for each one of the individual phase shifting elements in the array.

24. The method according to claim 21, wherein while varying an amount of phase shift for an individual phase shifting element all other phase shifting elements are not varied.

25. The method according to claim 21, further comprising:
   varying an amount of phase shift for several of the phase shifting elements at different frequencies; and
   determining a phase offset of each frequency component in the interference signal.

* * * * *

UNITED STATES PATENT AND TRADEMARK OFFICE
CERTIFICATE OF CORRECTION

| | |
|---|---|
| PATENT NO. | : 10,790,585 B2 |
| APPLICATION NO. | : 16/279885 |
| DATED | : September 29, 2020 |
| INVENTOR(S) | : Christopher Poulton et al. |

It is certified that error appears in the above-identified patent and that said Letters Patent is hereby corrected as shown below:

In the Specification

At Column 1, Line number 11, before the "TECHNICAL FIELD", please insert the following paragraph:
--STATEMENT AS TO FEDERALLY SPONSORED RESEARCH
This invention was made with government support under contract no. HR0011-16-C-0108 awarded by DARPA. The government has certain rights in the invention.--

Signed and Sealed this
Sixth Day of June, 2023

Katherine Kelly Vidal
*Director of the United States Patent and Trademark Office*